(12) United States Patent
Snider et al.

(10) Patent No.: US 10,213,751 B2
(45) Date of Patent: Feb. 26, 2019

(54) APPARATUS AND METHOD FOR PREPARING A LIQUID MIXTURE

(71) Applicant: FORMULANOW, LLC, Fargo, ND (US)

(72) Inventors: Douglas Snider, Chicago, IL (US); Nikki Lamb, West Fargo, ND (US); Aaron Lamb, West Fargo, ND (US)

(73) Assignee: FormulaNow, LLC, Fargo, ND (US)

( * ) Notice: Subject to any disclaimer, the term of this patent is extended or adjusted under 35 U.S.C. 154(b) by 0 days.

(21) Appl. No.: 15/166,028

(22) Filed: May 26, 2016

(65) Prior Publication Data

US 2016/0346743 A1 Dec. 1, 2016

Related U.S. Application Data

(62) Division of application No. 12/945,563, filed on Nov. 12, 2010, now Pat. No. 9,352,287.

(Continued)

(51) Int. Cl.
*A47J 31/00* (2006.01)
*B01F 1/00* (2006.01)
(Continued)

(52) U.S. Cl.
CPC ........... *B01F 1/0027* (2013.01); *A47J 31/407* (2013.01); *B01F 1/0033* (2013.01); *B01F 3/20* (2013.01);
(Continued)

(58) Field of Classification Search
CPC ...... A47J 31/3695; A47J 31/407; A47J 31/40; B01F 1/0027; B01F 1/0033; B01F 3/20;
(Continued)

(56) References Cited

U.S. PATENT DOCUMENTS 3,352,460 A 11/1967 Herring
3,514,919 A 6/1970 Ashton et al.
(Continued)

FOREIGN PATENT DOCUMENTS

CN 100591253 C 2/2010
EP 1440640 A2 7/2004
(Continued)

OTHER PUBLICATIONS

Third Office Action received for Israeli app No. 219729 dated Aug. 10, 2016.
(Continued)

*Primary Examiner* — Anshu Bhatia
(74) *Attorney, Agent, or Firm* — Dorsey & Whitney LLP

(57) ABSTRACT

A mixing apparatus, puncturing mechanism, and cartridge are disclosed. The mixing apparatus has a housing and a drawer with a recess. Corresponding cartridges may be inserted into the drawer and slid into the housing to facilitate mixing a liquid with contents of the cartridge. The liquid may originate from a reservoir in the mixing apparatus or a direct line. Also inside the housing of the mixing apparatus is the puncturing mechanism. The puncturing mechanism has a nozzle configured to puncture a lid of a cartridge and inject liquid to mix with the contents of the cartridge. The puncturing mechanism is further configured to drive an internal puncturing unit inside of the cartridge through a lower portion of the cartridge to allow liquid from the nozzle and contents of the cartridge to be dispensed into a receptacle.

9 Claims, 15 Drawing Sheets

Related U.S. Application Data

(60) Provisional application No. 61/260,742, filed on Nov. 12, 2009.

(51) Int. Cl.
*A47J 31/40* (2006.01)
*B01F 3/20* (2006.01)
*B01F 15/00* (2006.01)
*B65D 85/804* (2006.01)

(52) U.S. Cl.
CPC ...... *B01F 3/2078* (2013.01); *B01F 15/00253* (2013.01); *B01F 15/00318* (2013.01); *B65D 85/8043* (2013.01); *A47J 31/40* (2013.01); *B01F 2001/0061* (2013.01); *B65D 2203/06* (2013.01)

(58) Field of Classification Search
CPC .............. B01F 3/2078; B01F 15/00253; B01F 15/00318; B01F 2001/0061; B65D 85/8043; B65D 2203/06
USPC .......................................................... 99/295
See application file for complete search history.

(56) References Cited

U.S. PATENT DOCUMENTS

| | | |
|---|---|---|
| 3,719,505 A | 3/1973 | Mazza |
| 4,008,832 A | 2/1977 | Rodth |
| 4,103,772 A | 8/1978 | Wiegner |
| 4,679,707 A | 7/1987 | Sedam |
| 4,994,019 A | 2/1991 | Rohrbough |
| 4,994,029 A | 2/1991 | Rohrbough |
| 5,060,812 A | 10/1991 | Ogle, II |
| 5,442,997 A | 8/1995 | Branz et al. |
| 5,797,311 A | 8/1998 | Gasthuber et al. |
| 6,173,117 B1 | 1/2001 | Clubb |
| 6,829,431 B1 | 12/2004 | Haven et al. |
| 6,941,855 B2 | 9/2005 | Denisart et al. |
| 7,569,240 B2 | 8/2009 | Brizio |
| 7,607,385 B2 | 10/2009 | Halliday et al. |
| 7,863,546 B2 | 1/2011 | Hestekin et al. |
| 8,016,808 B2 | 9/2011 | Keller |
| 8,720,320 B1 * | 5/2014 | Rivera ............... A47J 31/0678 99/295 |
| 8,863,649 B1 * | 10/2014 | Rao ......................... A47J 31/00 700/15 |
| 9,352,287 B2 | 5/2016 | Snider et al. |
| 2002/0144604 A1 | 10/2002 | Winkler et al. |
| 2003/0070555 A1 | 4/2003 | Reyhanloo |
| 2004/0197444 A1 | 10/2004 | Halliday et al. |
| 2004/0228955 A1 | 11/2004 | Denisart et al. |
| 2004/0261625 A1 | 12/2004 | Fowlkes |
| 2006/0165851 A1 | 6/2006 | Brizio |
| 2006/0278093 A1 | 12/2006 | Biderman et al. |
| 2006/0289316 A1 | 12/2006 | Henry |
| 2007/0073263 A1 | 3/2007 | Liu et al. |
| 2007/0204930 A1 | 9/2007 | Phallen et al. |
| 2008/0160153 A1 * | 7/2008 | Hestekin ............... A47J 31/407 99/323.3 |
| 2008/0187638 A1 | 8/2008 | Hansen |
| 2008/0250935 A1 * | 10/2008 | Van Belleghem .. A47J 31/0642 99/289 R |
| 2008/0298171 A1 | 12/2008 | Dunlop et al. |
| 2009/0034358 A1 | 2/2009 | Brod et al. |
| 2009/0101020 A1 * | 4/2009 | Webster ............... A47J 31/404 99/289 R |
| 2009/0126577 A1 * | 5/2009 | Ternite ............... A47J 31/0673 99/295 |
| 2009/0190433 A1 | 7/2009 | Davis |
| 2010/0080077 A1 | 4/2010 | Coy |
| 2010/0238757 A1 | 9/2010 | Capps |
| 2011/0110180 A1 | 5/2011 | Snider et al. |
| 2012/0060697 A1 | 3/2012 | Ozanne |

FOREIGN PATENT DOCUMENTS

| | | |
|---|---|---|
| EP | 1593329 A1 | 11/2005 |
| GB | 1 256 247 | 12/1971 |
| GB | 1256247 A | 12/1971 |
| JP | 01-274719 A | 11/1989 |
| JP | H02219790 A | 9/1990 |
| JP | 332611 A | 2/1991 |
| JP | 11-503925 | 4/1999 |
| JP | 2000-355375 | 12/2000 |
| JP | 2000355375 A | 12/2000 |
| JP | 2001-061663 | 3/2001 |
| JP | 2001061663 A | 3/2001 |
| JP | 2004-514488 | 5/2004 |
| JP | 2005339210 A | 12/2005 |
| JP | 2006-517429 | 7/2006 |
| JP | 2006517429 A | 7/2006 |
| JP | 2007503231 A | 2/2007 |
| JP | 2008-514337 | 5/2008 |
| JP | 2009526599 A | 7/2009 |
| JP | 2009183700 A | 8/2009 |
| WO | 02/087400 A1 | 11/2002 |
| WO | 2003059778 A2 | 7/2003 |
| WO | 2006014936 A2 | 2/2006 |
| WO | 2007/111884 A2 | 10/2007 |
| WO | 2007114685 A1 | 10/2007 |
| WO | 2008113779 A2 | 9/2008 |
| WO | 2008/132571 A1 | 11/2008 |
| WO | 2008/144471 A1 | 11/2008 |
| WO | 2008132571 A1 | 11/2008 |
| WO | 20080132571 A1 | 11/2008 |
| WO | 2009013777 A1 | 1/2009 |
| WO | 2009133570 A2 | 11/2009 |
| WO | 20100148160 A2 | 12/2010 |

OTHER PUBLICATIONS

Second Examination Report for NZ Pat Appl. No. 701718 dated May 14, 2016.
EESR for EP 10 830 811.5 dated Apr. 3, 2013.
Fourth Office Action issued for Mex. Pat. Appln. No. MX/a/2012/005536 dated Mar. 10, 2016.
Office Action for CA Application No. 2,780,638 dated Jul. 15, 2013.
Office Action received for Israeli appln No. 219729 dated May 31, 2015.
Office Action received for MX appln No. MX/a/2012/005536 dated Jul. 23, 2014.
Preliminary Office Action received for Israeli Appln No. 219729 dated Dec. 19, 2012.
Received Office action for NZ Appln No. 599927 dated Feb. 7, 2013.
Received Office action for NZ Appln No. 599927 dated Aug. 15, 2014.
Third Office Action issued for Mex. Pat. Appln. No. MX/a/2012/005536 dated Sep. 18, 2015.
Examiner's Report for Appl No. CA2780638 dated Mar. 28, 2014.
Fifth Office Action for CN Appl No. 201080055290.X dated Nov. 11, 2015.
First Examination Report for IP No. 701718 dated Nov. 11, 2014.
First Office Action for CN Appl No. 201080055290.X dated Dec. 18, 2013.
First Office Action received for AU Appl. No. 2010319379 dated Nov. 26, 2015.
Fourth Office Action for CN Appl No. 201080055290.X dated Feb. 13, 2015.
JP Notice of Rejection for Appl No. 2012-539027 dated Sep. 24, 2013.
Notice of Rejection Grounds for JP Appl. No. 2012-539027 dated Sep. 30, 2014.
Notice of Rejection Grounds received for Japanese Patent Application No. 2015-068335 dated Mar. 1, 2016.
Second Notice of Preliminary Rejection from KIPO regarding KR 102012-7015032 dated Jul. 18, 2014.
Second Office Action for CN Appl No. 201080055290.X dated Aug. 18, 2014.

(56) References Cited

OTHER PUBLICATIONS

Second Office Action issued for Mex. Pat. Appln. No. MX/a/2012/005536 dated Feb. 26, 2015.
Substantive Examination Adverse Report issued for Malaysian Patent Appl. No. PI 2012002082 dated Jan. 15, 2015.
Substantive Examination Report issued for MY Patent Appl. No. PI2012002082 dated Nov. 30, 2015.
Third Office Action for CN Appl No. 201080055290.X dated Feb. 13, 2015.
International Search Report and Written Opinion dated Aug. 29, 2011 for International Application No. PCT/US2010/056579.
Examination Report for IN Appl. No. 4363/CHENP/2012 dated Jun. 28, 2017.
First Office Action dated May 3, 2017 for Mexico application # MX/a/2014/014005.
Notice of Rejection dated Feb. 6, 2018 for JP Application No. 2017038920 (with English Translation).
First Examination Report dated Nov. 17, 2017 for Australian App No. 2016250501.
Fourth Office Action dated Dec. 11, 2017 for Israeli App. No. 219729.
Second Office Action for Mexican Application No. MX/a/2014/014005 dated Oct. 25, 2017.
First Office Action for CN App No. 201610286666.7; dated Apr. 19, 2018.

* cited by examiner

APPARATUS AND METHOD FOR PREPARING A LIQUID MIXTURE

CROSS REFERENCE TO RELATED APPLICATION(S)

This application is a divisional of U.S. patent application Ser. No. 12/945,563 filed Nov. 12, 2010, issued as U.S. Pat. No. 9,352,287 on May 31, 2016, which claims priority to U.S. Provisional Application No. 61/260,742, filed Nov. 12, 2009, the applications and patents of which are incorporated herein by reference, in their entirety, for any purpose.

TECHNICAL FIELD

Embodiments of the invention relate generally to mixing apparatus and methods, and more specifically, to automated mixing apparatus and methods for mixing a liquid with a mixture ingredient in a sanitary manner.

BACKGROUND OF THE INVENTION

Many mixtures that are made for human consumption require a minimal level of care in mixing together the mixture ingredients. However, in many instances, the quality or character of the mixture can be inadvertently compromised if the minimal level of care is not used in mixing the ingredients of the mixture. For example, the mixing ratios may be improper due to mixing an incorrect amount of liquid (e.g., water) with a mixture ingredient (e.g., concentrate). The temperature of the liquid mixed into the mixing ingredient may be incorrect making consumption of the mixture difficult or unpleasant, and in some cases, causing incomplete dissolution of the mixture ingredient in liquid. Moreover, when making the same mixture at several different times, the resulting mixtures may be inconsistent, for example, the mixtures made at different times may have different mixing ratios and may be made at different mixing temperatures.

In many instances, variations in the quality and character of the mixture is not the result of carelessness, but of the circumstances at the time the mixture is made. For example, where the mixture is an infant nutritional supplement, such as formula, mixing may occur in the middle of the night or under urgent time constraints due to the demands of the infant. Fatigue or the rushed nature of the situation can detrimentally affect the level of care the parent uses when mixing the formula. As known, maintaining consistency of the quality of the formula consumed by the infant is desirable for the health and well being of the infant.

Machines for automated mixing have been developed to address some of the problems presented by manually mixing. The machines automate the dispensing of the appropriate amount of water and at the correct temperature during mixing with the mixture ingredient. The resulting mixture is dispensed into an awaiting receptacle. Some of these machines are designed for mixing a single serving of a mixture, for example, single servings of coffee. In such machines, single serving cartridges are used that contain a mixture ingredient to be mixed with water, the quantity and temperature of which is controlled by the machine. Other machines have a larger container with multiple servings of a mixture ingredient (e.g., "bag-in-box"), which is dispensed under the control of the machine and mixed with an appropriate amount of water and at the correct temperature.

Although these machines automate the mixing process, the machines are often designed in such a way that residue from the mixture remains on part of the machine after the mixture is mixed and dispensed. For example, some machines have a channel, tube, or guide that guides a mixture to an opening where the mixture is dispensed into a receptacle. In other machines, a device that punctures a container to allow the ingress and egress of water during the mixing operation comes into contact with the container contents. As a result, residue from a previous mixing operation may contaminate the mixture of a current mixing operation. This is an issue particularly relevant to machines that mix single-servings of mixtures. Where the mixture ingredient is perishable, the residue may create an environment for the growth of bacteria or other organisms, which will be introduced into subsequently made mixtures and may present health concerns. In these types of machines, regular cleaning and maintenance is necessary to maintain a sanitary condition.

DETAILED DESCRIPTION

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. While the following description will be made in the context of mixing infant formula, it will be appreciated that the invention encompasses embodiments for mixing other mixtures such as juice, coffee, and hot chocolate, and may be used in other applications as well such as in pharmaceutical processes. In other instances, well-known circuits, control signals, timing protocols, and software operations have not been shown in detail in order to avoid unnecessarily obscuring the invention.

Figure 1:
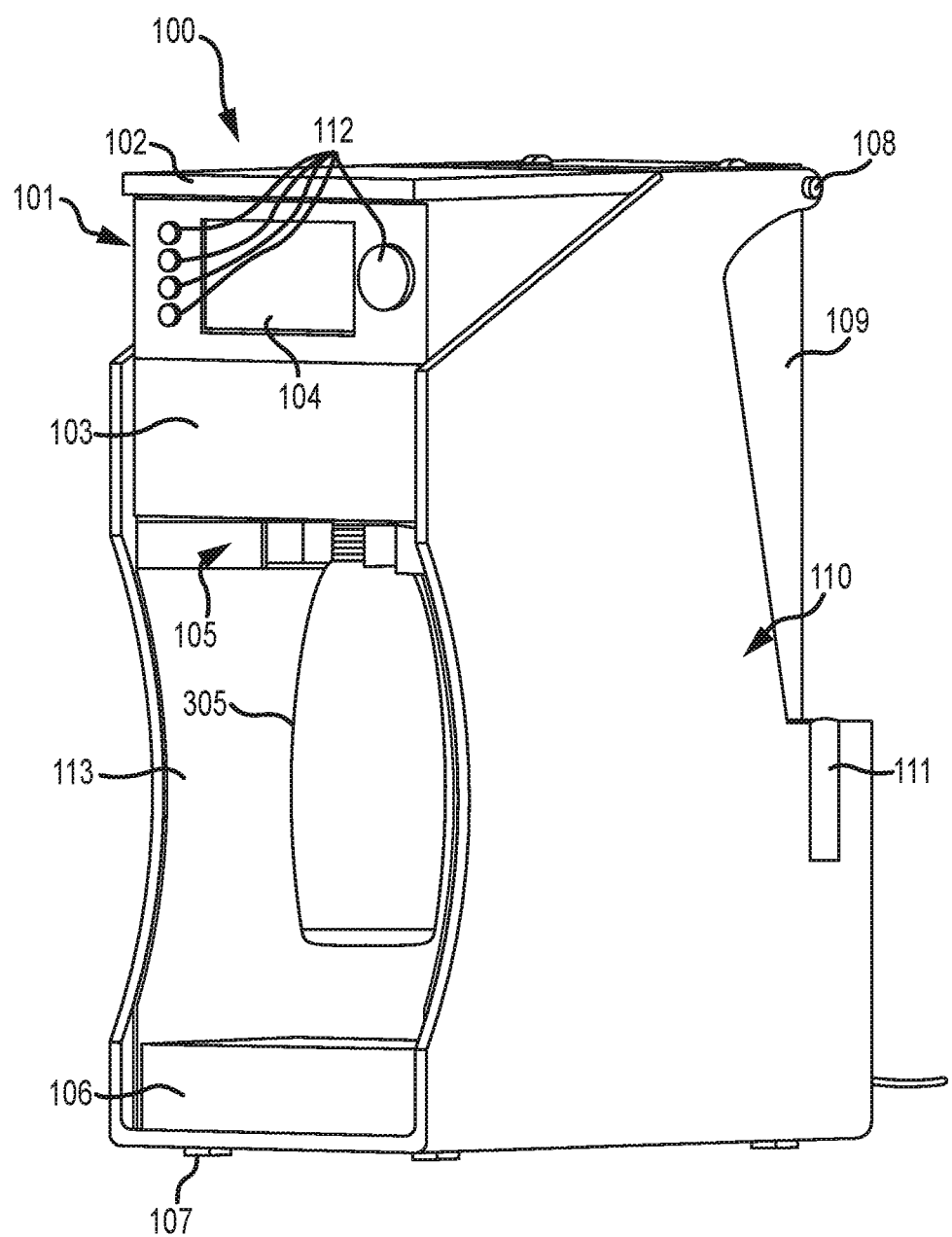
FIGS. 1 and 2 are perspective drawings of a mixing apparatus according to an embodiment of the invention.
Figure 2:
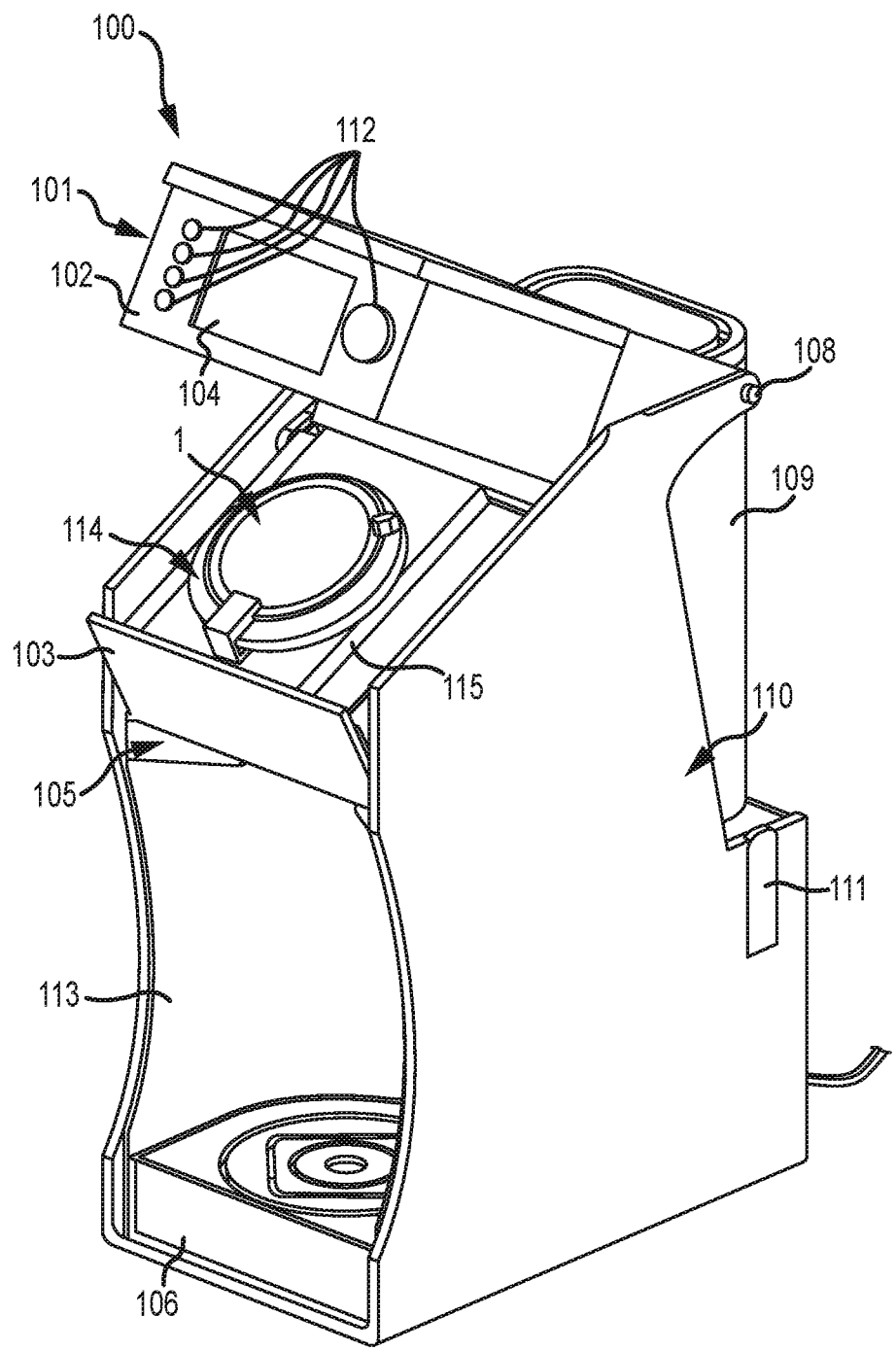

FIGS. 1 and 2 illustrate a mixing apparatus 100 according to an embodiment of the invention. The mixing apparatus 100 has a clamshell-type closure mechanism 101. As will be explained in more detail below, the apparatus 100 accepts cartridges 1 of a mixture ingredient in the closure mechanism 101 to be mixed with a liquid, such as water, according to a mixing recipe. The mixture ingredient of a cartridge 1 may be in solid or liquid form. In the closed position (as shown in FIG. 1) the mixing apparatus 100 punctures the cartridge 1 and provides heated or unheated liquid through the cartridge 1 to be mixed with the mixture ingredient. The resulting mixture is dispensed into a receptacle 305. A mixing recipe, which may be preset or manually selected in some embodiments, is used by the mixing apparatus 100 to provide the appropriate amount and appropriate temperature of liquid for the mixture.

The closure mechanism 101 includes an upper closure piece 102 and a lower closure piece 103. The upper closure piece 102 includes a puncturing mechanism (not shown in FIG. 1 or 2), user interface and controls 112 and a display screen 104. Setting, control and operation of the mixing apparatus 100 is enabled through the use of the user interface and controls 112, for example, setting time, date, language, and other operational configurations, selecting a mixing recipe, liquid temperature and/or quantity, and initiating a mixing operation. The display screen 104 provides a user with visual information. The lower closure piece 103 includes a cartridge holder 114 and cartridge base 115 for receiving and holding a cartridge 1 in place during operation. Housed in the upper closure piece 102 are electronic processing components that receive input from the user interface and controls 112 and various sensors. In response, the electronic processing components generate control and command signals for managing operation of the mixing apparatus 100 and to perform mixing operations. In another embodiment of the invention, a sensor (e.g., an optical scanner, such as a barcode scanner) for obtaining information from a cartridge positioned in the cartridge holder is included in the upper closure piece 102. The upper closure piece 102 is pivotally coupled at a rear closure hinge 108 to a housing 110 in which various components of the mixing apparatus 100 are contained. For example, heating components and pumping components are located in and protected by the housing 110. Conventional heating and pumping components may be used in the mixing apparatus 100.

The mixing apparatus 100 further includes a receptacle niche 113 in which a receptacle 305 is received by receptacle holder 105 that is configured to hold the receptacle 305 in place during mixing operations and to receive the dispensed mixture. An overflow tray 106 fits into a bottom of the receptacle niche 113 to receive any spillage or overflow of liquid or mixture. In some embodiments, the overflow tray 106 is a liquid-tight receptacle having a cover with drain holes or grooves into which any spillage is received. The overflow tray 106 can be removable for cleaning.

A reservoir 109 stores the liquid that is used for mixing. In some embodiments, the reservoir 109 may be removable from the apparatus 100 for easy filling. The reservoir 109 can have a lid and a handle for carrying as well. The reservoir 109 may also contain a water filter and a method for indicating when the filter should be replaced.

The mixing apparatus 100 in some embodiments includes an interface module 111. The interface module 111 allows a user to interface with the mixing apparatus 100, such as to download information from or upload information to the apparatus 100. For instance, the interface module 111 can store a record of what the mixing apparatus 100 has dispensed. A user can take the interface module 111 (e.g., USB flash memory) insert it into a computer and download the information. In other embodiments, software for the electronic processing components can be updated by loading the new software onto the interface module 111 and inserting it back into the mixing apparatus 100. For example, when new products are on the market, the user could upload information to the interface module 111 which can then be used to upload the information to the mixing apparatus 100 for mixing and dispensing the new product. The interface module 111 may be used in some embodiments to update product information. For example, if there were a product recall on a batch of mixture ingredient, the user could download the recall information onto the interface module 111 via a website, upload the recall information into the mixing apparatus 100, and the mixing apparatus 100 would not process any mixture ingredient having the batch number. In alternative embodiments of the invention, the interface module 111 includes a wireless transceiver for communicating with another wireless transceiver. For example, a user could transfer information from a website directly to the mixing apparatus 100 via a wireless enabled hand held device connected to the Internet. Conversely, information could be wirelessly uploaded from the mixing apparatus 100 to a hand held device or nearby computer.

FIG. 2 illustrates the mixing apparatus 100 with the closure mechanism 101 in an open position. As previously discussed, the lower closure piece 103 includes a cartridge holder 114 and cartridge base 115 for receiving and holding a cartridge 1 in place during mixing. In the open position, a mixture ingredient cartridge 1 can be placed into the cartridge holder 114, as shown in FIG. 2. In some embodiments of the invention the cartridge holder 114 includes cartridge holder datum tab 126 (FIG. 5) and a cartridge holder input tab 127 (FIG. 5) located along the circumference of the holder 114 for orientation and identification of the cartridge 1 (e.g., content, concentration, quantity, etc.). The cartridge holder datum tab 126 does not move and functions as a datum. An upper ring of the cartridge holder 114 rotates and snaps into pre-designed locations so that the cartridge holder input tab 127 can be rotated to different positions relative to the cartridge holder datum tab 126. As will be described in more detail below, the upper closure piece 102 is notched to fit around the cartridge holder datum tab 126 so that a second notch in the upper closure piece 102 is positioned in relation to the cartridge holder input tab 127.

Figure 3:
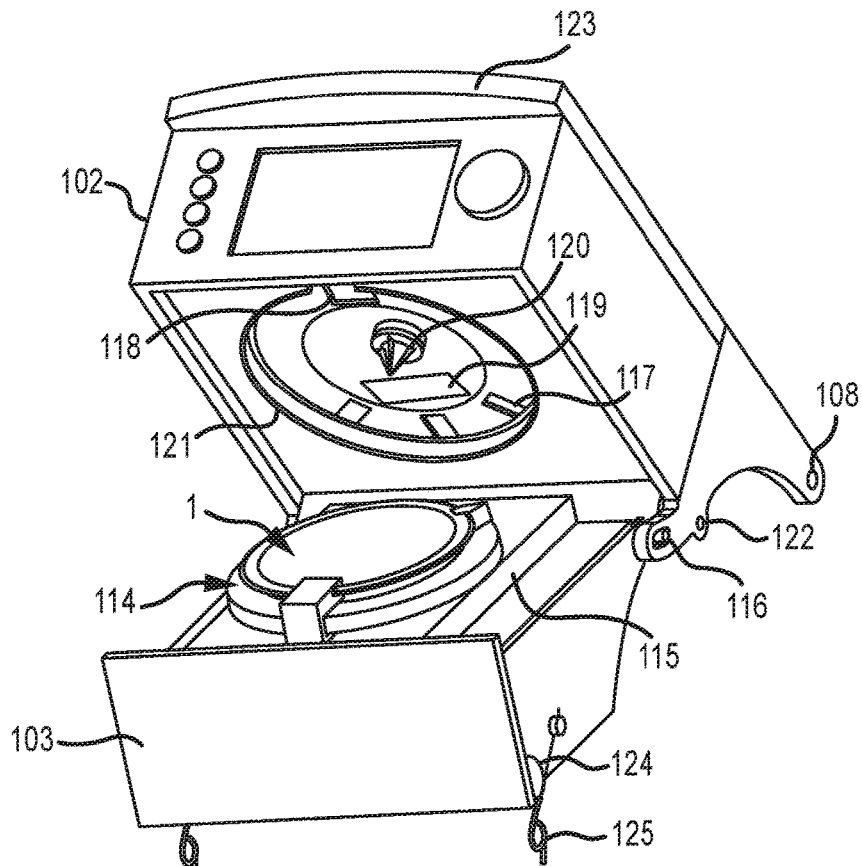
FIG. 3 is a perspective drawing of a closure mechanism according to an embodiment of the invention for a mixing apparatus.

FIG. 3 illustrates a closure mechanism according to an embodiment of the invention. The upper closure piece 102 is hingeably coupled to the lower closure piece 103 at center pivot hinges 116. The rear of the bottom closure piece 103 tilts around the center pivot hinges 116 as the upper closure piece 102 is opened so that the bottom closure piece is positioned for easier insertion of a cartridge 1 into the cartridge holder 114. A cartridge holder recess 121 located in the upper closure piece 102 fits over the cartridge 1 and cartridge holder 114 when the closure mechanism 101 is closed. Cartridge holder input recesses 117 and cartridge holder datum recess 118 are located in the cartridge holder recess 121 and positioned to correspond to the different positions of the cartridge holder input tab 127 and the cartridge holder datum tab 126, respectively.

Figure 5:
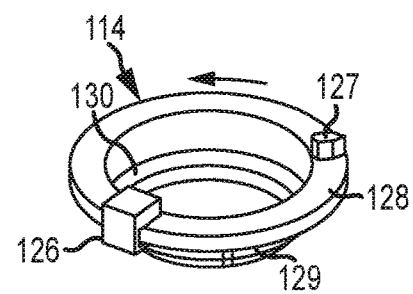
FIG. 5 is a perspective drawing of a cartridge holder according to an embodiment of the invention for a mixing apparatus.

Operation of the cartridge holder datum tab 126 (FIG. 5), cartridge holder input tab 127, cartridge holder data recess 118, and cartridge holder input recesses 117 according to an embodiment of the invention will be described with reference to FIGS. 3 and 5. Turning to FIG. 5, the cartridge holder 114 includes the cartridge holder datum tab 126 at a fixed position and a cartridge holder input ring 128 that can be rotated and snapped into fixed positions to position the cartridge holder input tab 127 at different locations. A cartridge holder lower piece 129 is configured to snap into the cartridge holder base 115 (FIG. 3) and be securely fixed. The cartridge holder 114 further includes a cartridge holder pressure lip 130 on which a cartridge 1 rests when it is in place and provides a point of compression for the cartridge when the closure mechanism 101 is closed.

With reference to FIG. 3, when the closure mechanism 101 is closed, the cartridge holder input tab 127 (FIG. 5) extends into a corresponding cartridge holder input recess 117. When the tab 127 enters the input recess 117, it presses a corresponding switch, which conveys information to the electrical processing components as to which dispensing recipe (e.g., temperature, volume, etc.) to use for the mixture ingredient of the cartridge 1. As illustrated in FIG. 3, and as will be discussed in more detail below, a cartridge 1 has two notches on its lip. A first notch corresponds to the datum tab 126 which does not move and a second notch corresponds to the input tab 127. The location of the input notch on the cartridge 1 varies depending on the contents of the cartridge. For example, when the second notch in the cartridge 1 is located at a first position, the cartridge 1 will only fit into the cartridge holder 114 if the input tab 127 is also rotated to the first position. With the cartridge 1 inserted into the cartridge holder 114 and the closure mechanism 101 closed, the input tab 127 will fit into an input recess 117 corresponding to the first position of the input tab 127. A switch in the input recess 117 will be pressed by the input tab 127 and the pre-programmed mixing recipe corresponding to the input recess 117 in which the switch is pressed will be used to mix the mixture ingredient in the cartridge 1. In some embodiments, the mixing apparatus 100 is put into a manual mode by having the input tab 127 in one of the positions, during which the mixing recipe can be manually selected and set by a user to tailor preparation of the mixture.

The use of tabs 126, 127 and input recesses 117, 118 will help prevent an incorrect mixing recipe from being used for a particular mixture ingredient. For example, where cartridge 1 contains an infant formula concentrate, the tabs and input recesses prevent a user from inserting a cartridge having concentrate for 4 oz. of infant formula but selecting and using a mixture recipe for providing 6 oz. of infant formula. That is, the cartridge having infant formula concentrate in a ratio for a 4 oz. output would have the notch in its lid at position "X". The 4 oz. cartridge will only fit in the cartridge holder 114 when the cartridge holder input ring 128 is rotated so that the input tab 127 is at position "X." With the closure mechanism 101 closed the input tab 127 will fit into the input recess 117 at position "X," thereby indicating to the electrical processing components to use the mixture recipe for a 4 oz. output. In comparison, the cartridge for 6 oz. of infant formula will have an input notch in its lid at position "Y". Erroneous mixing will be prevented because the 6 oz. cartridge will not fit since the input tab 127 is in the "X" position and the input tab 127 will not trigger the "X" position switch in the "X" position input recess 117 since the cartridge lid for the 6 oz. cartridge will cover the input tab 127.

Returning to FIG. 3, in some embodiments a sensor 119 is positioned in the cartridge closure recess 121 to obtain information about the cartridge 1 when the closure mechanism 101 is closed. The sensor 119 can be an optical sensor, an example of which is a barcode scanner. In such an embodiment, the barcode scanner 119 will read a barcode on the lid of the cartridge 1. The bar code may be used to identify the mixture ingredient contained in the cartridge 1. The barcode may additionally, or alternatively, contain information about the proper mixing recipe, for example, how to dispense the product, the liquid-to-concentrate ratio, and temperature of the liquid. A benefit of having this information in barcode form is that less memory may be used for storing instructions for the electrical processing components to properly mix and dispense the mixture. Moreover, as new products are released, or if the concentration level of the mixture ingredient changes, the mixing apparatus 100 can adapt to the new information. In embodiments where the mixture ingredient is concentrated infant formula, it is more important than with adult beverages that a user not be able to prepare the infant formula using non-recommended ratios of liquid (i.e., water) and concentrate. For example, with coffee, a user can make it stronger or weaker to their liking. However, with infant formula, the water-to-concentrate ratios are important to the health and well being of the infant. As a precaution, the user should not be able to insert a cartridge designed for a 4 oz. output, for example, and accidentally or intentionally select a 6 oz. output. A barcode encoding a mixing recipe would take this step out of the hands of the user and provide for greater safety in product output.

In some embodiments the barcode is a three-dimensional (3D) barcode. Additional information beneficial for mixture preparation may be encoded through the use of 3D barcodes. For example, the barcode may contain a serial number, batch number and date of manufacture. With this type of information readable by the mixing apparatus 100, the mixing apparatus may be programmed to not dispense out-of-date product or a recalled product (if the user updates the machine with the recall information, e.g., via interface module 111). In another embodiment, new software updates could be encoded by the barcode. For example, a user could print out the barcode to be read by the mixing apparatus 100 to update the software.

A puncture nozzle 120 is located in the cartridge closure recess 121. The nozzle 120 is configured to puncture the cartridge 1 and provide liquid into the cartridge 1. The nozzle 120 includes a surface that pushes an internal puncture unit of the cartridge 1 (shown in FIGS. 8 and 9). In some embodiments, the nozzle 120 includes a pressure switch (not shown) to enable the mixing apparatus 100 to shut off liquid flow into a punctured cartridge in the event the mixture is not being dispensed from the cartridge.

Figure 4:
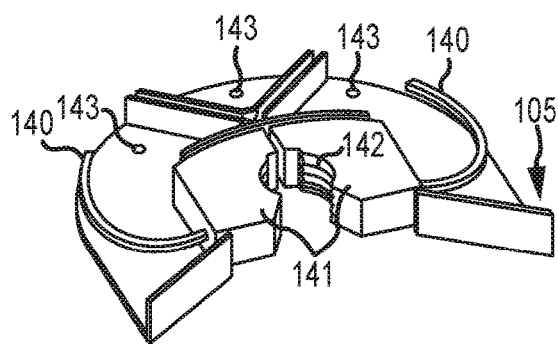
FIG. 4 is a perspective drawing of a bottle holder according to an embodiment of the invention for a mixing apparatus.

FIG. 4 illustrates a bottle holder 105 according to an embodiment of the invention. The bottle holder 105 includes gripper units 141 for holding a receptacle 305 (FIG. 1) in place during mixing operations to receive the mixture. Compression springs 140 extend from the gripper units 141 to provide a spring bias as the gripper units 141 are forced apart when a receptacle 305 is pushed into position to receive a mixture, thus providing a compression force to hold the receptacle 305 in place. The gripper units 141 may have ridges 142 formed on the inside curved surface that receives a receptacle 305. The ridges are configured to provide friction against a downward force of the receptacle 305 (e.g., as the mixture is dispensed into the receptacle) while allowing for a horizontal force to spread the gripper units 141 when receptacle is inserted and removed.

Figure 6:
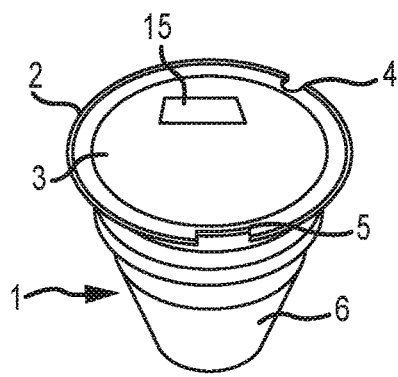
FIGS. 6 and 7 are perspective drawings of a cartridge according to an embodiment of the invention for use with a mixing apparatus.
Figure 7:
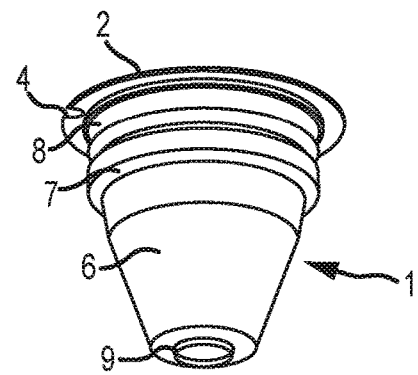

FIGS. 6 and 7 illustrate a cartridge 1 according to an embodiment of the invention. The cartridge 1 includes a cartridge lip 2 having a datum notch 5 and input notch 4. As previously discussed, the notches 4, 5 correspond to an input tab 127 and a datum tab 126 on the cartridge holder 114, and can be used ensure correct orientation of the cartridge 1 in the holder 114, as well as provide information to the mixing apparatus 100 about the cartridge and/or the mixing ingredient contained in the cartridge. The cartridge lip 2 may be configured to provide a clamping surface between an upper surface of the holder 114 and a surface of the cartridge closure recess 121 to hold the cartridge firmly in place when the closure mechanism 101 is in a closed position. A cartridge lid 3 seals in the content of the cartridge 1 (i.e., mixture ingredient). The cartridge lid may be formed from a material that can be punctured by a puncture nozzle as well as seals the cartridge 1 to maintain the quantity and quality of the mixture ingredient. The cartridge lid 3 may have a barcode 15 printed on it to provide information about the cartridge, the contents of the cartridge, or other information for embodiments of the mixing apparatus 100 having a barcode scanner.

Below the cartridge lip 2 are cartridge lower and upper compression ridges 7, 8. The lower compression ring 7 rests on the cartridge holder pressure lip 130 (FIG. 5) to keep the cartridge 1 in place. A cartridge dispensing nozzle 6 below the lower compression ring acts as a dispensing nozzle for the mixture during mixing. Because the cartridge 1 rests in the cartridge holder 114 on the lower compression lip 130, the cartridge dispensing nozzle 6 (i.e., lower portion) of the cartridge may be of various sizes, diameters and can taper at a variety of angles, which allows for holding varying amounts of mixture ingredients. The bottom of the dispensing nozzle has an opening with a drip lip 9 to guide the output mixture from the cartridge into a receptacle. Inside the opening is a membrane to keep the contents sealed in the cartridge 1 until it is punctured. As will be described in more detail below, when the closure mechanism 101 is in the closed position, the cartridge 1 deforms at a region between the compression ridges 7 and 8 so that the upper compression ring 8 is compressed against the lower compression ring 7. As a result, the length of the cartridge 1 is contracted, and as will be explained in more detail below, forces an internal puncture unit through the lower membrane at the bottom of a cartridge dispensing nozzle 6.

Figure 8:
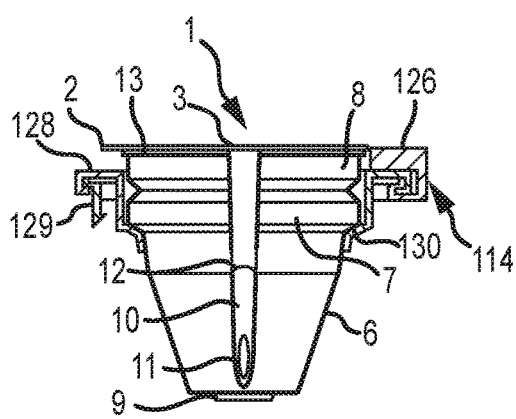
FIG. 8 is a cross-sectional drawing of the cartridge of FIGS. 6 and 7 positioned in a cartridge holder.
Figure 9:
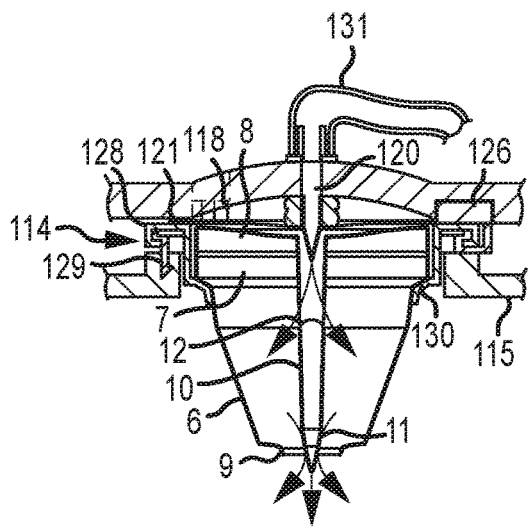
FIG. 9 is a cross-sectional drawing of the cartridge of FIGS. 6 and 7 positioned in a cartridge holder and punctured by a puncture nozzle.

FIGS. 8 and 9 illustrate cross-sectional views of a cartridge according to an embodiment of the invention positioned in a cartridge holder 114. FIG. 8 illustrates the cartridge in an uncompressed condition and FIG. 9 illustrates the cartridge in a compressed condition, such as when the upper closure piece 102 of the closure mechanism 101 is closed onto the lower closure piece 103. As previously discussed, a surface of the lower compression ring 7 rests on the cartridge holder pressure lip 130 when positioned in the cartridge holder 114.

As shown in FIG. 8, an internal puncture unit (IPU) 10 is positioned in the cartridge 1. The IPU 10 is generally hollow and has an opening at an end proximate the cartridge lid 3 and extends to a pointed end configured to puncture the membrane at the bottom of the dispensing nozzle 6. An IPU support 13 holds the IPU 10 in position in the cartridge and deflects when the IPU 10 is forced downward, such as when the cartridge is compressed. The IPU 10 includes an IPU output opening 11 that when the cartridge 1 is compressed, has a portion of the opening 11 outside the cartridge and another portion of the opening 11 inside the cartridge. In this manner, liquid in the cartridge is allowed to flow into the portion of the opening 11 inside the cartridge and be dispensed from the portion of the opening 11 on the outside the cartridge. In some embodiments, the IPU 10 is fluted to facilitate dispensing of the mixture through the puncture of the membrane at the bottom of the cartridge dispensing nozzle 6. The IPU 10 further includes an IPU diversion stop 12 that guides liquid provided into the open end of the IPU 10 from the puncture nozzle 120 through an opening above the stop and into the cartridge where it can mix with the mixture ingredients. The diversion stop 12 may also have an opening to allow the liquid to pass straight through and out the bottom in the event of a partial puncture, thus, preventing the cartridge from over filling.

FIG. 9 illustrates the cartridge 1 positioned in the cartridge holder 114 and compressed by the closure mechanism 101 in a closed position. The closing of the closure mechanism 101 causes the puncture nozzle 120 to puncture the cartridge lid 3 and mate with a top opening of the IPU 10. The cartridge 1 is also compressed so that the lower and upper compression ridges 7, 8 are brought together. The compression of the cartridge 1 and the force of the puncture nozzle against the IPU 10 causes the IPU 10 to puncture the membrane at the bottom of the cartridge 1. Liquid is provided through the puncture nozzle 120 from a liquid input tube 131 to the IPU 10. As previously discussed, the IPU 10 includes an IPU diversion stop 12 that guides water into the cartridge to mix with the contents of the cartridge 1. As also previously discussed, in the punctured position the IPU output opening 11 has a portion inside the cartridge into which the mixture enters and a portion outside of the cartridge from which the mixture is dispensed. As also shown in FIG. 9, the cartridge lip 2 is clamped between a surface of the cartridge holder 114 and a surface of the cartridge closure recess 121 to hold the cartridge 1 in place during mixing.

As illustrated in FIG. 9 and as previously described, the mixing of the contents of the cartridge 1 with a liquid provided by the puncture nozzle 120 takes place without any part of the mixing apparatus 100 coming in contact with the contents in the cartridge 1. By avoiding contact with the contents of cartridge 1, the cleanliness of the mixing apparatus 100 can be maintained without the need for disassembly and cleaning of parts. Additionally, by not having parts of the mixing apparatus 100 come in contact with the contents of a cartridge 1 during mixing, residue from a previous mixture will not contaminate a current mixture during its preparation.

Figure 10:
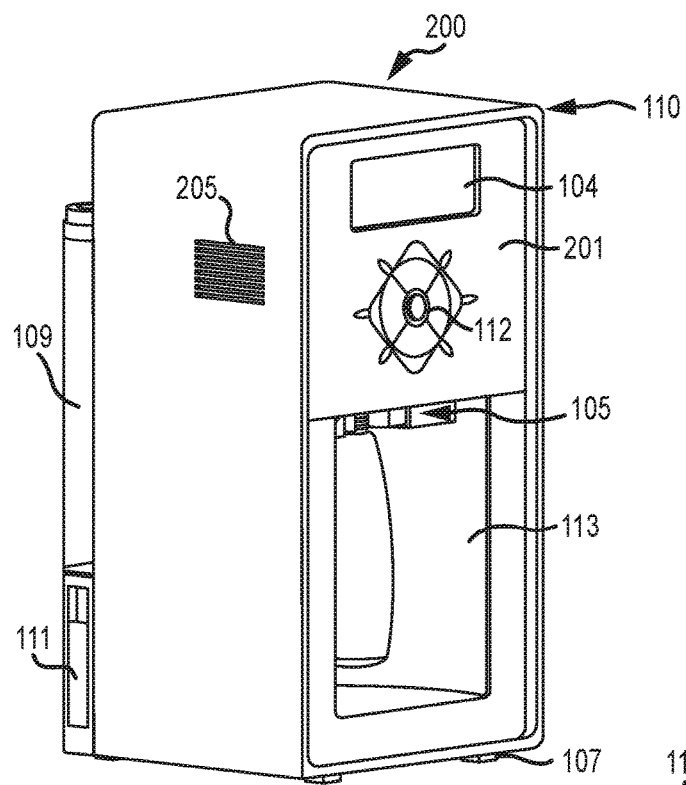
FIGS. 10 and 11 are perspective drawings of a mixing apparatus according to another embodiment of the invention.
Figure 11:
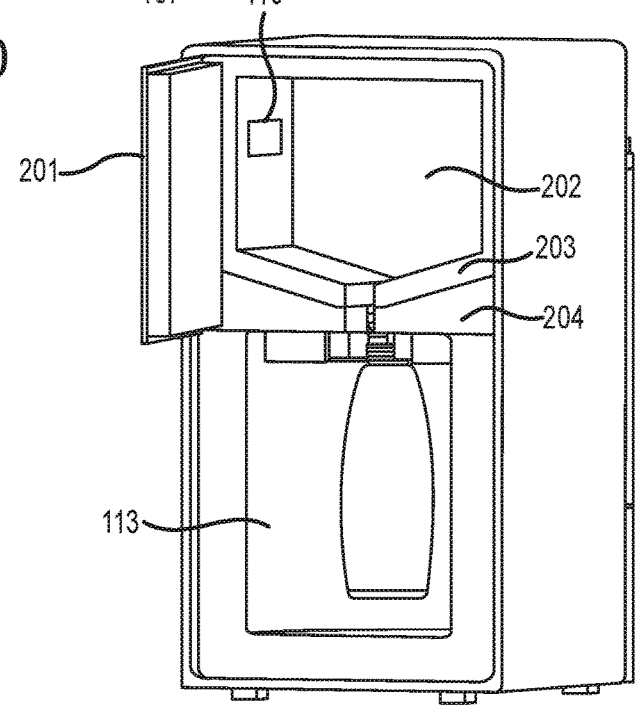

FIGS. 10 and 11 illustrate a mixing apparatus 200 according to an embodiment of the invention. Reference numbers previously introduced will be used in describing the mixing apparatus 200 where applicable. In contrast to the mixing apparatus 100, rather than using a container (e.g., cartridge) that is punctured and into which liquid is introduced during mixing, the mixing apparatus 200 uses mixture ingredients dispensed from a container (not shown) through a pump valve, as will be described in more detail below.

The mixing apparatus 200 includes a door 201 for the storage area 202 into which the container of mixture ingredient is stored. A sensor 119 is positioned in the storage area 202 to obtain information about the container of mixture ingredients when positioned in the storage area 202. The sensor 119 can be an optical sensor, an example of which is a barcode scanner. In such an embodiment, the barcode scanner 119 will read a barcode on the container. In some embodiments, the door 201 is insulated and the storage area 202 insulated by insulation 203 so that the storage area 202 can be cooled by a refrigeration unit (not shown), for example, a peltier cooler, included in the housing 110. Vent openings 205 may be included to vent the interior of the housing 110. A dispensing unit housing 204 of the mixing apparatus 200 includes a liquid dispensing unit to control dispensing of the mixture ingredient through a pump valve and provide liquid to be mixed with the contents dispensed from the container. Integrated in the door 201 are user interface controls 112 to allow a user to control operation of the mixing apparatus 200 as previously discussed. A display 104 is also included on the door 201 to provide a user with visual feedback and operation information for the mixing apparatus 200. A bottle holder 105 is positioned under the dispensing unit housing 204 to receive and hold a receptacle 305 in the output receptacle niche 113 during mixing and dispensing of a mixture.

Figure 12:
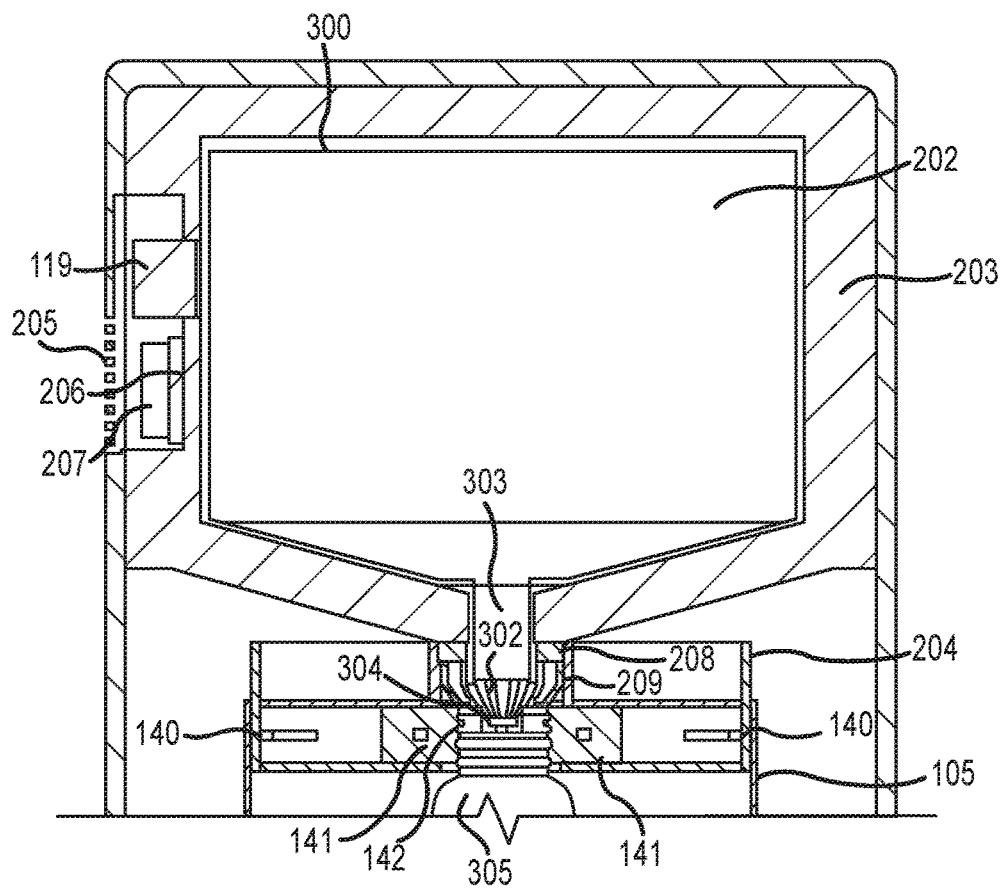
FIG. 12 is a cross-sectional drawing of a portion of the mixing apparatus of FIGS. 10 and 11 with a mixture ingredient container according to an embodiment of the invention.

FIG. 12 illustrates a container 300 according to an embodiment of the invention positioned in the storage area 202. Also shown in FIG. 12 are a peltier cooler 206 and a fan 207 for cooling the storage area 202 for embodiments having this feature. The dispensing unit housing 204 includes a solenoid actuator 208 that operates with a pump valve 303 to control flow of the mixture ingredient from the container for mixing. For example, in one embodiment, the solenoid actuator opens a one-way pump valve in the pump valve 303 through electromagnetic force. In some embodiments, the pump valve 303 is integrated with the container 300. The pump valve 303 may also be a reusable attachment coupled to the container 300. A liquid dispenser 209 provides liquid (e.g., water) for mixing with the contents of the container 300. Liquid dispensed by the liquid dispenser 209 is guided by dispensing nozzle 302 to be mixed with the mixture ingredient dispensed from the container at a tip of the dispensing nozzle 302. A dispensing nozzle drip lip 304 at the tip of the dispensing nozzle 302 further guides the mixture into a receptacle 305 held in place by gripper 141 of the bottle holder 105. For example, in some embodiments, the dispensing nozzle 302 is radially ribbed to have the liquid guided to the same point at which the mixture ingredient is dispensed from the dispensing nozzle 302.

Figure 13:
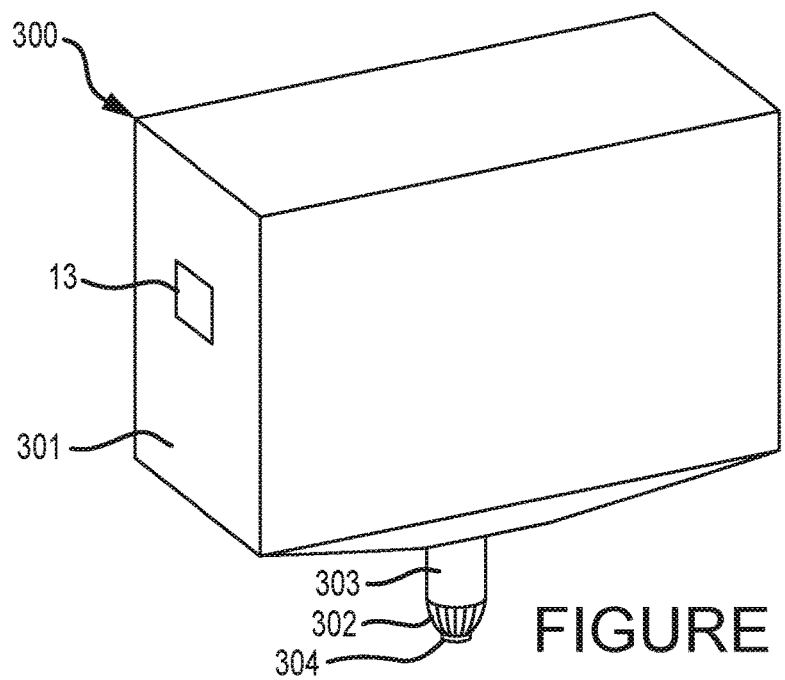
FIG. 13 is a perspective drawing of the mixture ingredient container according to an embodiment of the invention for the mixing apparatus of FIGS. 10 and 11.

The container 300 includes a box portion 301 in which the mixture ingredient is contained and has a lower portion that is shaped to guide the mixture ingredient to the pump valve 303. For example, as shown in FIGS. 12 and 13, the lower portion of the container 300 is angled downward so that under the force of gravity the mixture ingredient flows through the pump valve 303 and to the dispensing nozzle 302. The container 300 may also include a barcode 13 to provide information about the container, the contents of the container, or other information for mixing, as previously discussed.

In operation, liquid dispensed from liquid dispenser 209 is mixed with the mixture ingredient as it is dispensed from the container 300 from the bottom of nozzle 302. By having the liquid and mixture ingredient mixed in this manner, the mixture ingredient does not come in contact with any part of the mixing apparatus 200. As with the mixing apparatus 100, the cleanliness of the mixing apparatus 200 can be maintained without the need for disassembly and cleaning of parts. Moreover, contamination of a current mixture can be avoided because there is no residue on the mixing apparatus 200 from the mixing of a previous mixture.

Figure 14:
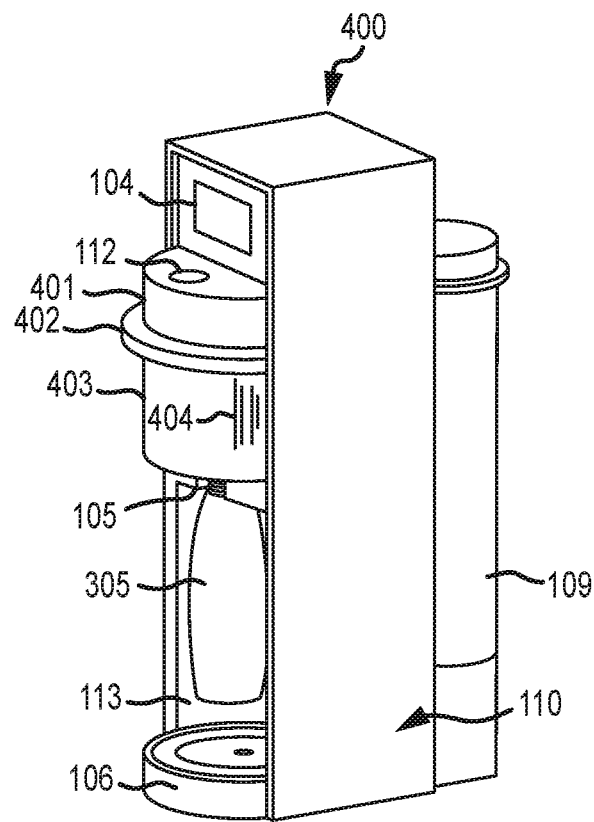
FIGS. 14 and 15 are perspective drawings of a mixing apparatus according to another embodiment of the invention.
Figure 15:
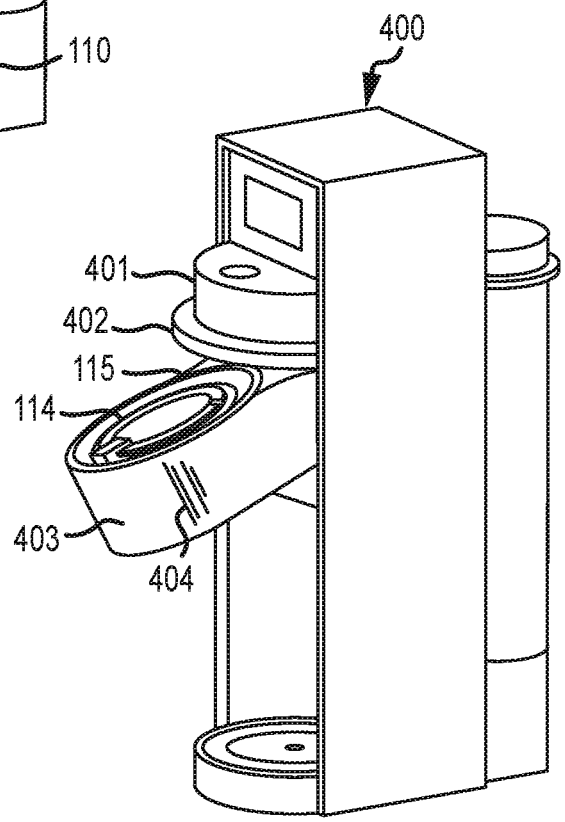

FIGS. 14 and 15 illustrate a mixing apparatus 400 according to another embodiment of the invention. Reference numbers previously introduced will be used in describing the mixing apparatus 400 where applicable. In contrast to the mixing apparatus 100, cartridges are positioned in a cartridge drawer 403 which slides out and pivots downward to facilitate insertion of cartridges in the cartridge holder 114. FIG. 14 illustrates the cartridge drawer 403 in a closed position (for mixing) and FIG. 15 illustrates the cartridge drawer in an open position (for cartridge insertion). The cartridge drawer 403 slides back into place under a puncture housing 401 that includes a puncture nozzle 120 and a cartridge closure recess 121. Grip ridges 404 may be included on the cartridge drawer 403 to help a user grip it when opening or closing. A handle 402 is used to puncture a cartridge 1 positioned in the cartridge holder 114 and when the cartridge drawer 403 is closed. The puncture nozzle 120 and the cartridge closure recess 121 are attached to the handle 402 so that when it is moved downward, it will move the puncture nozzle 120 and the cartridge closure recess 121 into position for holding the cartridge in place, puncturing the cartridge lid 3 and driving an internal puncture unit 10 of the cartridge 1 through the lower membrane of the cartridge 1.

Figure 16:
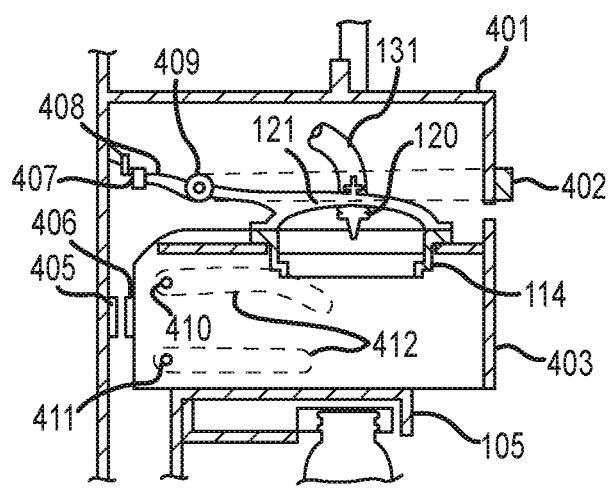
FIGS. 16 and 17 are cross-sectional drawings of a puncture housing and cartridge drawer according to an embodiment of the invention for a mixing apparatus.
Figure 17:
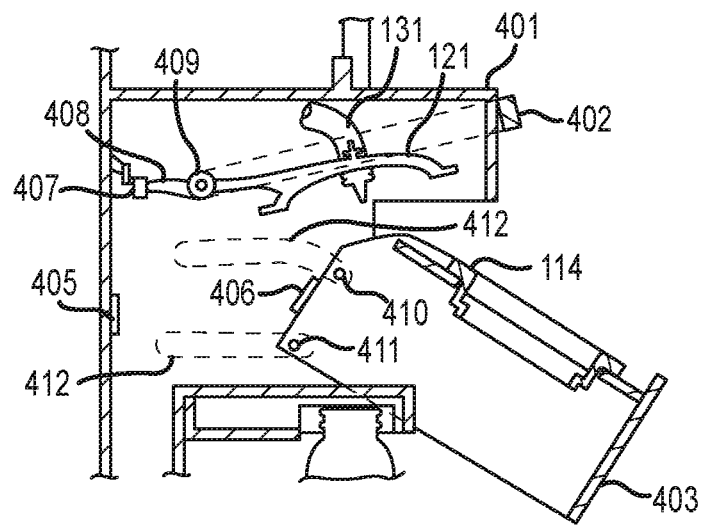

FIGS. 16 and 17 illustrate a cross-sectional view of the puncture housing 401 and the cartridge drawer 403 according to an embodiment of the invention. FIG. 16 illustrates the cartridge drawer 403 in the closed position and the handle 402 in a downward position and FIG. 17 illustrates the cartridge drawer 403 in open position and the handle 402 in an upward position.

As shown in FIG. 16, when the cartridge drawer 403 is closed and the handle 402 is rotated about a handle hinge 409 to the downward position, the puncture nozzle 120 and the cartridge closure recess 121 are also moved downward into position to clamp a cartridge lip 2 of a cartridge 1 (not shown in FIGS. 16 and 17) between the cartridge closure recess 121 and the cartridge holder 114, and puncture the cartridge lid 3. Liquid to mix the contents of the cartridge 1 is provided through the nozzle 120 from liquid input tube 131. Mixing of the cartridge contents is performed as previously described. Magnets 405 and 406 are used to attract and align the drawer 402 when in a closed position. A locking spring 407 and locking bar 408 are used to hold the handle 402 in place in the downward position during mixing of the cartridge contents but allows the locking bar 408 to be released upward when enough force is applied to the handle 402.

When opening the cartridge drawer 403, the handle 402 is positioned in its upward position to move the puncture nozzle 120 and the cartridge closure recess 121 upward and out of the way for the drawer 403 to be pulled open. The drawer 403 is pulled open by pulling with enough force to overcome the attraction of magnets 405, 406. The cartridge drawer 403 includes drawer sliding pin 410 and drawer pivot pin 411 which slide in drawer slide tracks 412 as the drawer 403 is opened and closed. The drawer sliding pin 410 adds stability when the drawer 403 is opened or closed and slides downward when the drawer 403 is fully opened and pivoted downward. The drawer pivot pin 411 also slides in the drawer slide track 412 and helps maintain alignment as the drawer 403 is opened and closed. As the drawer 403 is fully opened, the drawer pivot pin 411 functions as a pivot so that the drawer 403 can pivot downward as shown in FIG. 17.

Figure 18:
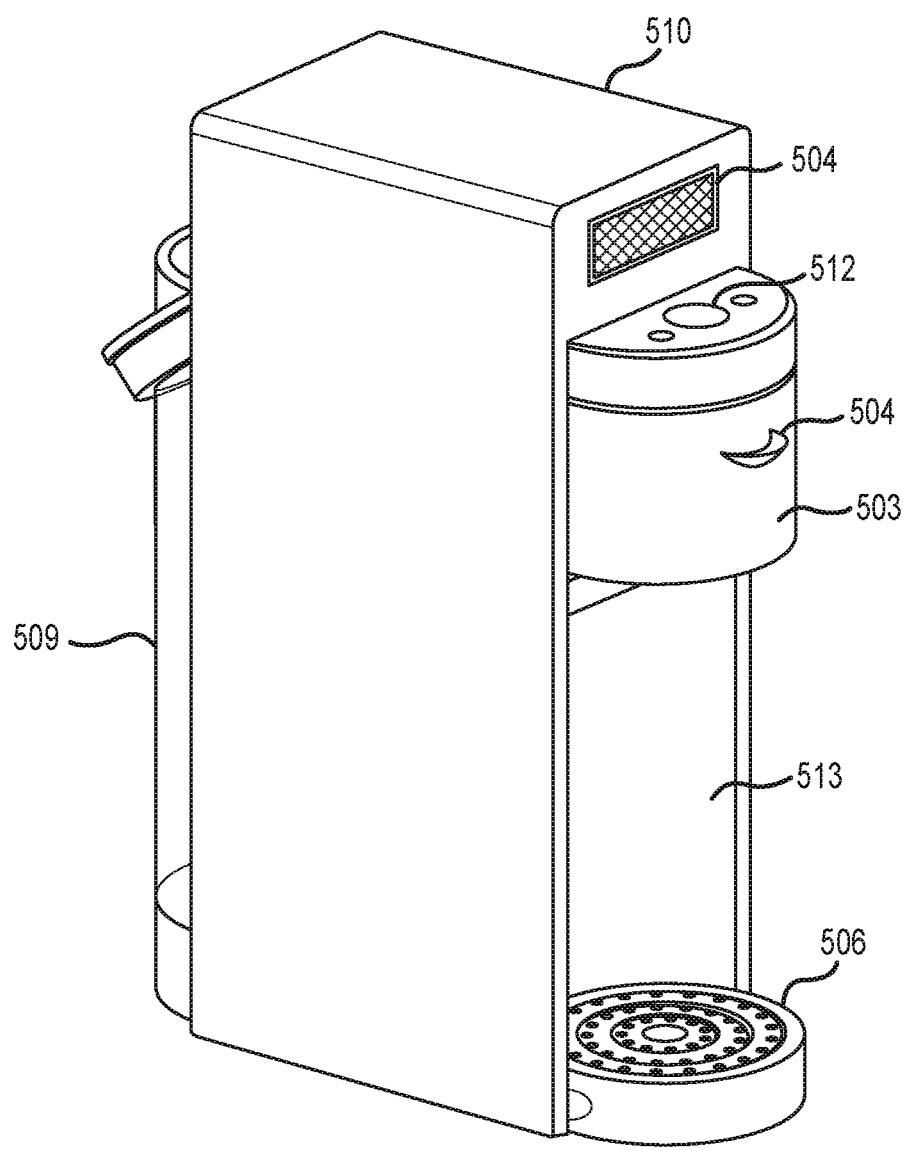
FIGS. 18 and 19 are perspective drawings of a mixing apparatus according to another embodiment of the invention.
Figure 19:
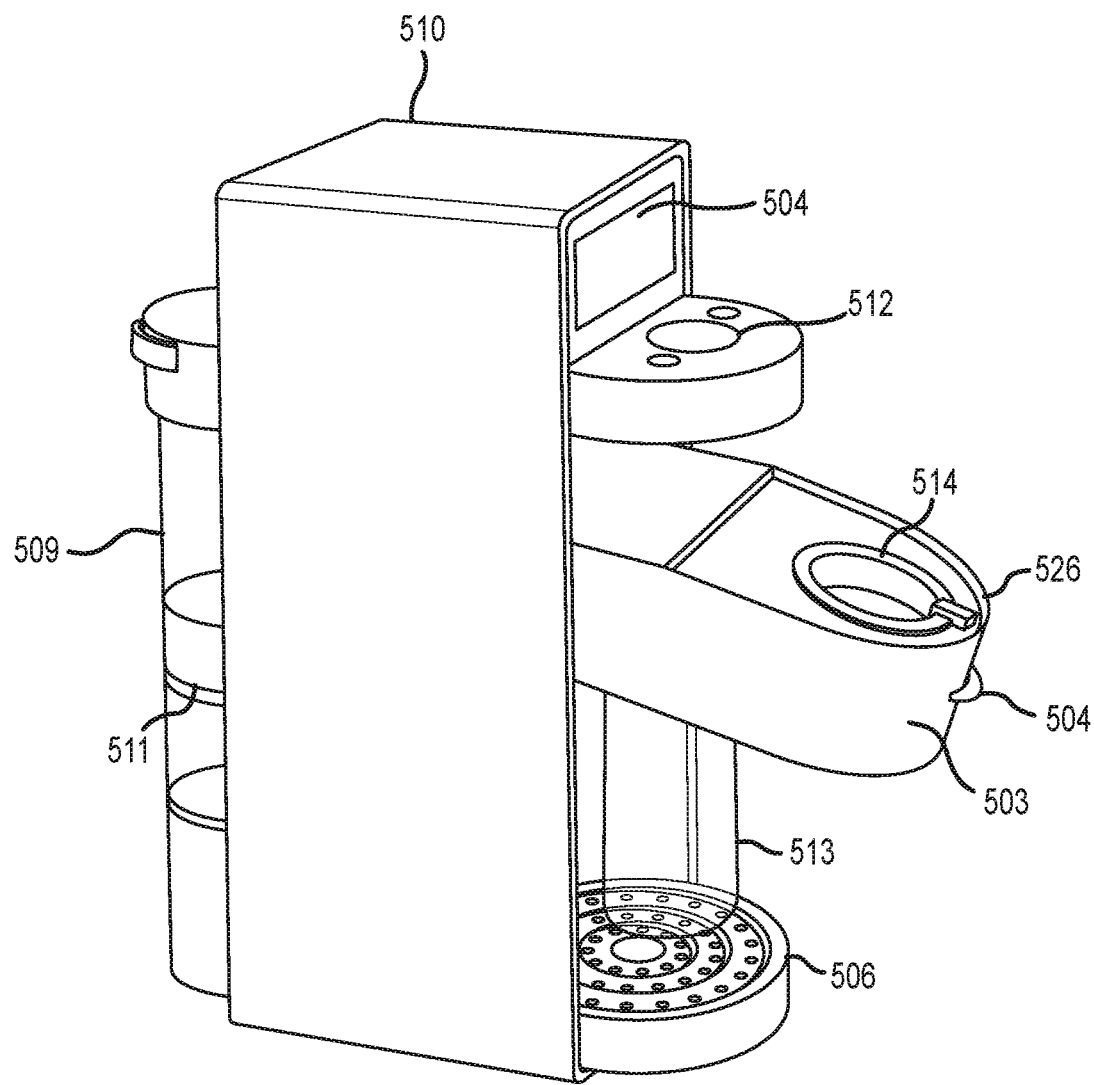
Figure 20:
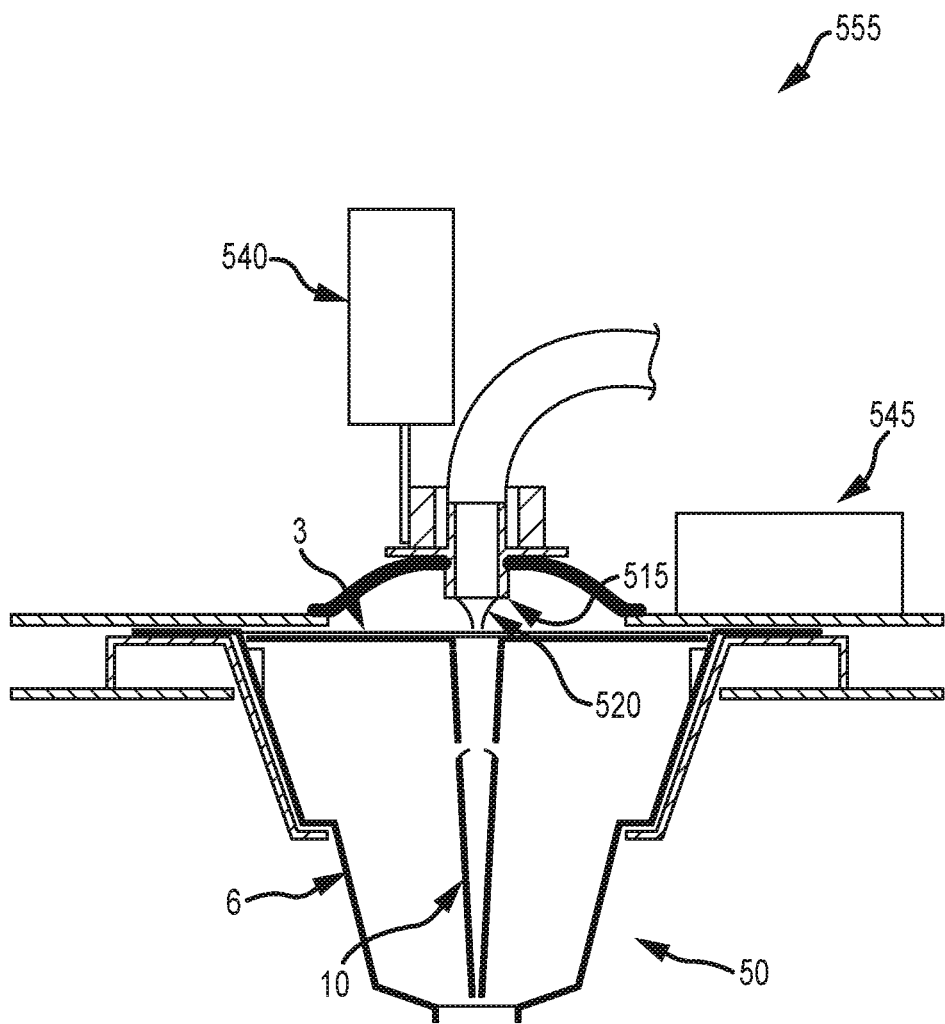
FIGS. 20, 21, and 22 are cross-sectional drawings of a puncture mechanism and cartridge according to an embodiment of the invention.
Figure 21:
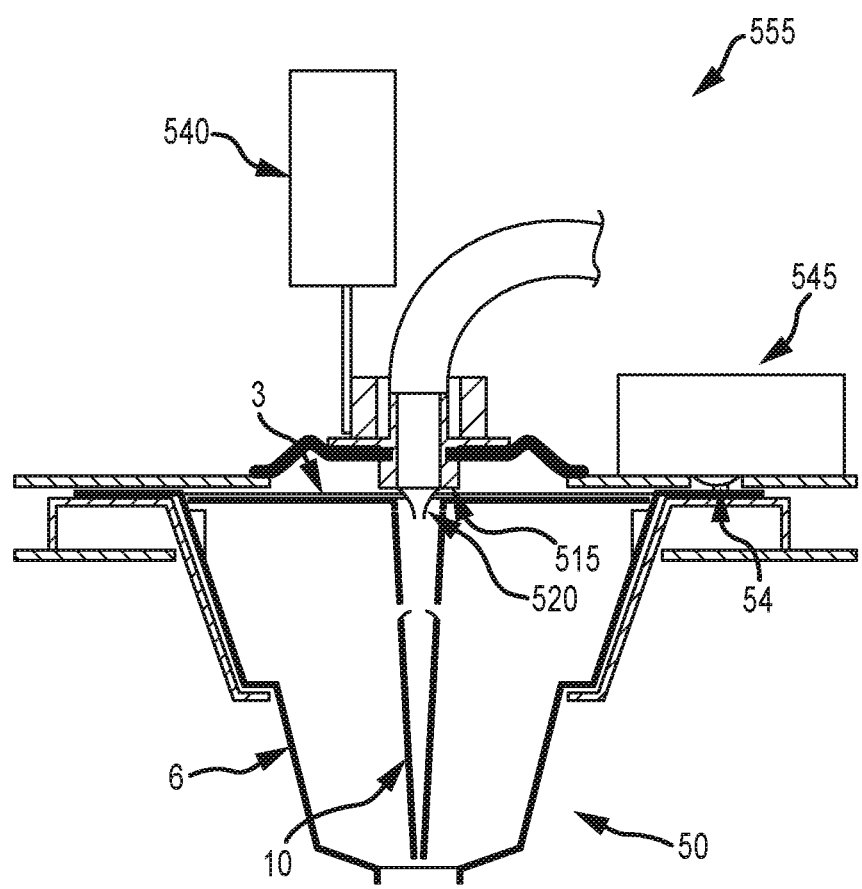
Figure 22:
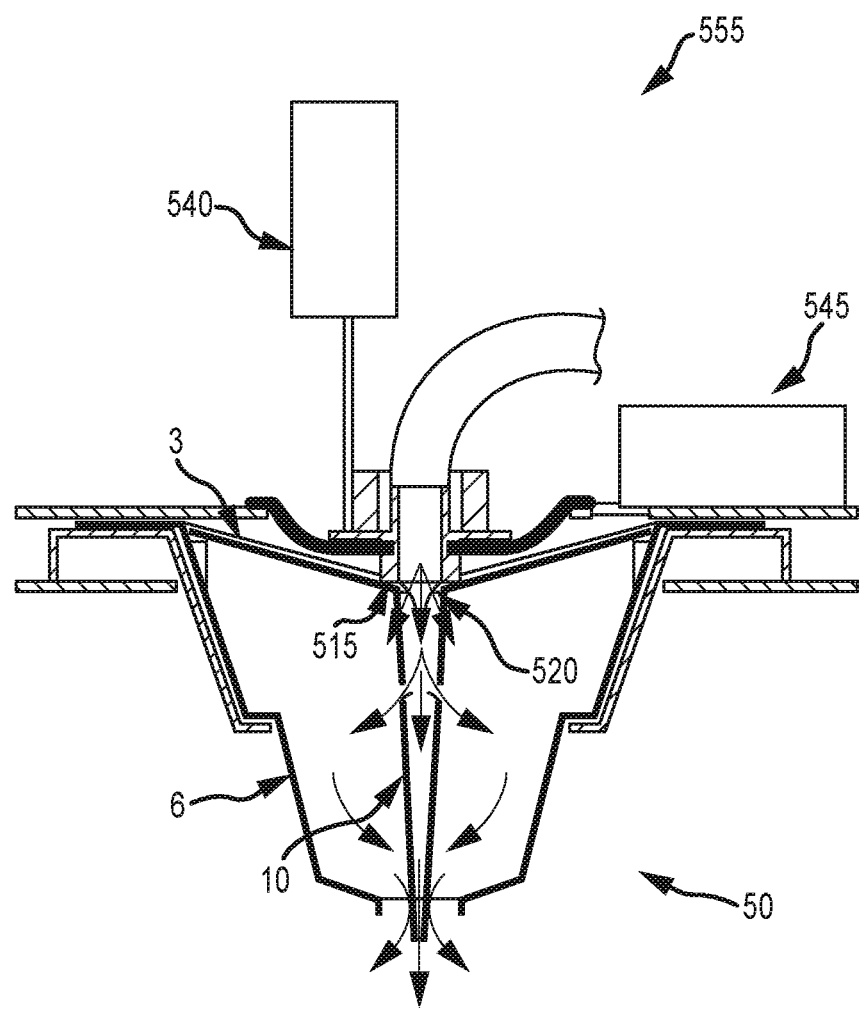

FIGS. 18 and 19 illustrate a mixing apparatus 500 according to an embodiment of the invention. Reference numbers previously introduced will be used in describing the mixing apparatus 500 where applicable. FIG. 18 illustrates mixing apparatus 500 with a drawer 503 which may slide in and/or out of housing 110 and may rotate downward to allow insertion of cartridges in the cartridge holder 514. FIG. 18 illustrates cartridge drawer 503 in a closed position (for mixing) and FIG. 19 illustrates the cartridge drawer 503 in an open position (for cartridge insertion). The cartridge drawer 503 may slide back into place under a puncture housing 501, aligning a cartridge in puncturing apparatus 555 as shown in FIGS. 20, 21, and 22. Magnets (not shown) may be used to align the drawer in a predetermined position. A drawer tab 504 may be included on the cartridge drawer 503 to help a user push or pull drawer 503 into an open or closed position.

Mixing apparatus 500 may further include a receptacle niche 513 in which a receptacle 305 may be inserted to receive liquid or mixture. Overflow tray 506 may be inserted into the bottom of receptacle niche 513. In at least one embodiment, overflow tray 506 is a liquid-tight receptacle for containing overflow or spillage of fluid or mixture and may be removed for cleaning.

In some embodiments, a reservoir 509 may be used for storing fluid that is used for mixing. Reservoir 509 may also be removed from mixing apparatus 500 for cleaning or filling with liquid to be mixed. A filter 511 may be included in reservoir 509 along with a filter indicator to designate when the filter 511 has expired or may be replaced. Reservoir 509 may contain fluid heating mechanisms (not shown) or be coupled to fluid heating mechanisms located within housing 510. In additional embodiments, a fluid source, such as a water line, may be connected to reservoir 509 or directly connected to mixing apparatus 500 to provide fluid to be mixed.

Mixing apparatus 500 may further include a user interface and controls 512 and display screen 504. Settings, controls, and operation of mixing apparatus 500 may be facilitated through the user interface and controls 512, and display screen 504 may provide a user with system information. Settings of mixing apparatus 500 may include network connectivity configuration enabling remote communication with users over a wireless transceiver (not shown). In another embodiment, a wireless transceiver is capable of communicating over cellular, Wi-Fi, Bluetooth, wired, or other wireless networks, and may be compatible with any communication protocol. Remote communication may be used, for example, to remotely upload data tracking usage of mixture apparatus 500, or alternatively, to initiate a mixing procedure. In one scenario, a user could communicate with mixing apparatus 500 from a remote device to initiate the mixing process and subsequently receive a notification from mixing apparatus 500 alerting the user that the mixing procedure has completed.

Media Interfaces may also be included in mixing apparatus 500. In at least one embodiment, a user may interface with the mixing apparatus 500. This may include uploading data to or downloading data from mixing apparatus 500. A user, for example, may download a history of usage of the mixture apparatus 500 and/or upload more recent firmware.

In contrast to the mixing apparatus 400, mixing apparatus 500 may use a solenoid 540 to move puncture nozzle 520 downward as shown in FIG. 20. Solenoid 540 may be a solenoid having any number of stages. FIG. 20 illustrates a cross-sectional view of puncturing system 555 according to an embodiment of the invention. In one embodiment, cartridge 50 does not have compression ridges and no cartridge compression occurs when the cartridge is inserted into puncturing system 555. In another embodiment, cartridge 50 may have compression ridges 7, 8 similar to cartridge 1 previously shown in FIGS. 8 and 9. Once fully inserted into puncturing system 555, cartridge 50 may be compressed so that compression ring 8 is pushed downward toward compression ring 7. The puncturing system 555 is configured to accept and position cartridges of various shapes, volumes, and dimensions, for example, the cartridges having longer or shorter cartridge dispensing nozzles may used with the puncturing system 555 to operate with cartridges of various volumes. As a result, the cartridge may be compressed and IPU 10 may be positioned closer to the membrane in the opening at the bottom of the dispensing nozzle.

After cartridge 50 is fully inserted into puncturing system 555, a user may interface with mixing apparatus 500 and initiate a mixing procedure or the procedure may initiate automatically. Once the process begins, solenoid 540 may cause puncture nozzle 520 to move in a downward direction and puncture cartridge lid 3 as shown in FIG. 21. In one embodiment, puncture nozzle 520 may include a temperature sensing element (not shown) and measure the temperature of contents of the cartridge. The temperature sensing element may be rinsed by the puncture nozzle 520 to prevent any future contamination resulting from contact with mixture ingredient in the cartridge. In another embodiment, the temperature of the contents of the cartridge may be read using an infrared thermometer (not shown), enabling the temperature to be measured without puncture nozzle 520 coming in contact with mixture ingredient. Temperature of liquid provided for mixing with the cartridge contents may be adjusted based on the temperature of mixture ingredient in the cartridge.

Solenoid 540 may move puncture nozzle 520 further downward, causing puncture nozzle lip 515 of puncture nozzle 520 to push the IPU 10 downward. This may cause the IPU 10 to puncture the membrane in the opening at the bottom of the dispensing nozzle as shown in FIG. 22. With the membrane of the opening of drip lip 9 punctured, mixture ingredient can be dispensed from the cartridge into a receptacle 305 (not shown) and mix with any fluid from reservoir 509 that may be injected by puncture nozzle 520. In some embodiments, after the puncture nozzle 520 punctures the cartridge lid 3, liquid is provided into the cartridge to "premix" with the contents of the cartridge. The puncture nozzle is then moved further downward to drive the IPU 10 downward and puncture the bottom of the cartridge. Additional liquid is further provided to fully mix the contents of the cartridge.

Figure 23:
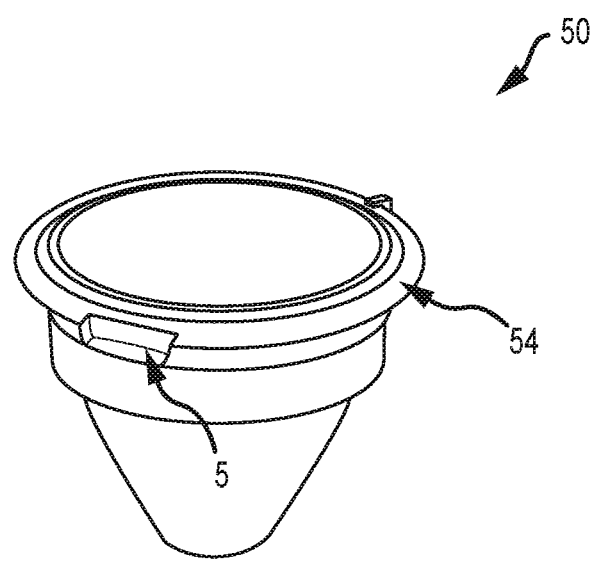
FIG. 23 is a perspective drawing of a cartridge according to an embodiment of the invention for use with a mixing apparatus.

FIG. 23 illustrates a cartridge 50 according to an embodiment of the invention. In contrast to cartridge 1, cartridge 50 includes a datum notch 5 and a identification marker 52. As shown in FIG. 19, cartridge 50 is inserted into cartridge holder 514 in drawer 503 and oriented such that datum notch 5 lines up with cartridge holder datum tab 526. In one embodiment, an identification marker may be a protrusion on lip 54 and product reader 545 (FIG. 20) may be a plurality of push buttons. When drawer 503 is in a closed position, the identification marker may impress on one of the push buttons of product reader 545, as shown in FIG. 21. This may indicate to the mixing apparatus 500 one or more characteristics about the contents of cartridge 50, such as volume, type, expiration date, or brand. In other embodiments, the identification marker and product reader 545 may be a barcode and barcode reader respectively, or may be a RFID tag, and RFID reader, respectively, to identify cartridge content characteristics.

Figure 24:
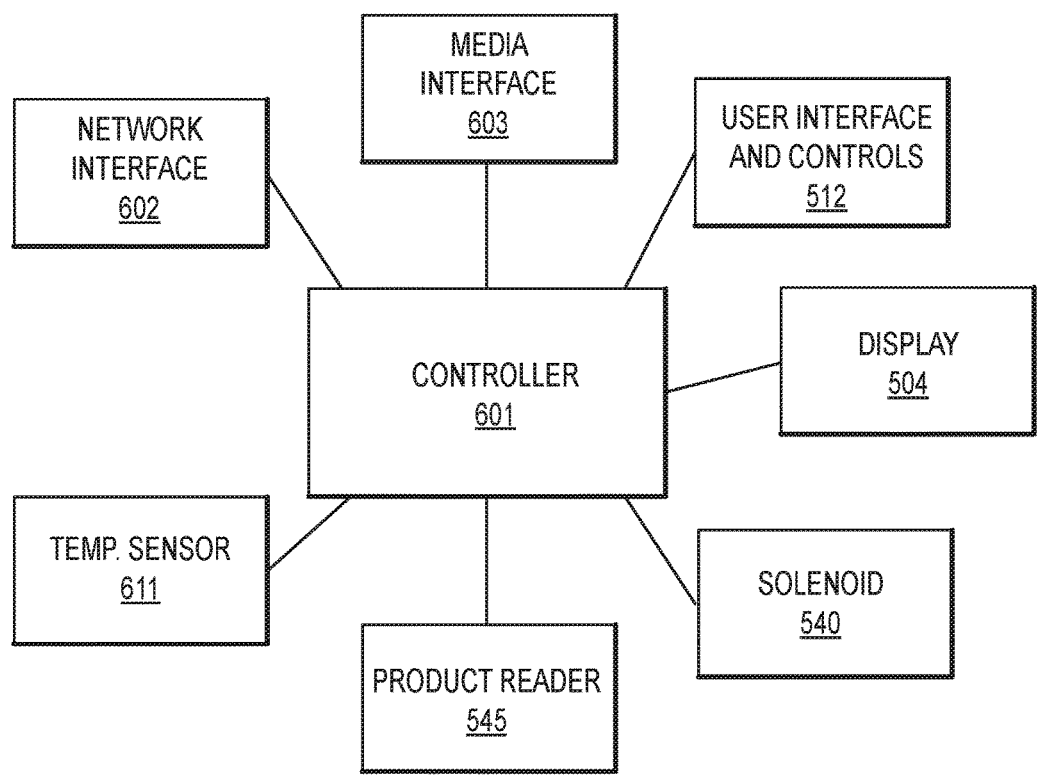
FIG. 24 is a block diagram of a controller-based system illustrating an example mixing apparatus according to an embodiment of the invention.

FIG. 24 illustrates a block diagram of a controller-based system showing a representative implementation of mixing apparatus 500 in which various aspects of the present invention may be embodied. In one embodiment, a controller 601 may interface with network interface 602 and media interface 603 to facilitate remote communication and allow a user to locally upload and download data respectively. Controller 601 may also receive user inputs from user interface and controls 512 and display information to the user on display 504. Temperature sensor 611 and product reader 545 may be coupled to controller 601 to provide cartridge information. Typically, the system will also include connection to a solenoid 540 that allows the system to facilitate an automated mixing process.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed:

1. A mixing apparatus comprising:
  a first recess configured to accept a cartridge comprising an internal puncture unit;
  a puncturing system comprising:
    a nozzle configured to puncture a lid of the cartridge when positioned in the first recess and further configured to provide liquid to the internal puncture unit of the cartridge; and
    a mechanism configured to move the nozzle between a plurality of positions with respect to the cartridge including a first position in which the nozzle punctures the lid and a second position in which the nozzle and the internal puncture unit are moved toward a second membrane such that the internal puncture unit punctures the second membrane, wherein the mechanism includes an upper closure piece and a lower closure piece operatively coupled to one another to deform the cartridge when the cartridge is positioned within the first recess and the upper closure piece is closed on the lower closure piece to further aid the internal puncture in puncturing the second membrane;
  a second recess configured to receive a receptacle to receive a mixture including the liquid from beneath the cartridges;
  an interface module comprising a removable memory device that stores information about mixtures dispensed by the mixing apparatus; and
  a processor operatively coupled to the interface module and configured to write the information about the mixtures dispensed by the mixing apparatus to the removable memory device, and wherein the removable memory device is configured to be communicatively coupled to another computer for downloading the information about the mixtures dispensed by the mixing apparatus.

2. The apparatus of claim 1, wherein the processor is configured to determine a correct mixing ratio between contents of the cartridge and the liquid provided by the nozzle.

3. The apparatus of claim 1, further comprising:
  a product reader configured to determine at least one characteristic about contents of the cartridge responsive to analyzing the cartridge.

4. The apparatus of claim 1, further comprising:
  a reservoir configured to store the liquid;
  a heating mechanism configured to heat the liquid to be provided by the nozzle.

5. The apparatus of claim 1, wherein the first recess is configured to accept and position cartridges of various shapes, volumes, dimensions, or combinations thereof.

6. The apparatus of claim 1, wherein the first recess is configured to position the cartridge in a predetermined orientation.

7. The apparatus of claim 1, wherein the removable memory device comprises USB flash memory.

8. The apparatus of claim 1, wherein the interface module comprises a wireless transceiver.

9. The mixing apparatus of claim 1, wherein the mechanism is configured to deform the cartridge at least in part by forcing an upper compression ridge of the cartridge toward a lower compression ridge of the cartridge.

* * * * *